(12) United States Patent
Montgomery et al.

(10) Patent No.: US 9,208,163 B2
(45) Date of Patent: Dec. 8, 2015

(54) METHODS FOR PRESERVING GENERATION DATA SET SEQUENCES

(71) Applicant: CA, Inc., Islandia, NY (US)

(72) Inventors: Marjory Montgomery, Colton, CA (US); William Stephens, Yucaipa, CA (US)

(73) Assignee: CA, INC., New York, NY (US)

( * ) Notice: Subject to any disclaimer, the term of this patent is extended or adjusted under 35 U.S.C. 154(b) by 52 days.

(21) Appl. No.: 13/741,783

(22) Filed: Jan. 15, 2013

(65) Prior Publication Data

US 2014/0201158 A1    Jul. 17, 2014

(51) Int. Cl.
G06F 17/30    (2006.01)

(52) U.S. Cl.
CPC .......... *G06F 17/30115* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 6,154,740 A * | 11/2000 | Shah | 1/1 |
| 7,958,090 B2 | 6/2011 | Harm | |
| 2006/0288048 A1* | 12/2006 | Kamohara et al. | 707/200 |
| 2010/0082553 A1* | 4/2010 | Beatty et al. | 707/679 |
| 2010/0312754 A1* | 12/2010 | Bear et al. | 707/685 |
| 2013/0110790 A1* | 5/2013 | Matsumoto et al. | 707/679 |

OTHER PUBLICATIONS

IBM—Unpredictable behavior when GDG with absolute & relative numbering wraps, IBM Technote (FAQ), Available at: http://www-304.ibm.com/support/docview.wss?uid=isg3S1000448.

* cited by examiner

*Primary Examiner* — Robert Beausoliel, Jr.
*Assistant Examiner* — Pedro J Santos
(74) *Attorney, Agent, or Firm* — Vierra Magen Marcus LLP (57) ABSTRACT

Methods for automating the processing of generation data groups as groups prior to data recovery are described. The generation data groups to be recovered may correspond with a data storage volume that has been taken offline or has suffered a hardware failure. Prior to data recovery, a table of data sets associated with the data to be recovered may be created and then sorted based on the base names, creation dates and generation numbers of the data sets. The sorted table may be used to identify a particular sequence of generation data sets associated with a particular generation data group to be recovered. The generation data sets corresponding with the particular generation data group to be restored may be selected based on a catalog status of the particular generation data group and whether the particular generation data group is in a rolled-off or wrapped state.

15 Claims, 5 Drawing Sheets

METHODS FOR PRESERVING GENERATION DATA SET SEQUENCES

BACKGROUND

The present disclosure relates to methods for managing and recovering data stored on storage devices.

Tiered storage techniques allow for the movement of data across different tiers of a data storage infrastructure between higher-cost, higher-performance storage devices (e.g., hard disk drives) and relatively lower-cost, lower-performance storage devices (e.g., magnetic tape drives). A tiered storage management system (or hierarchical storage management system) typically has the ability to move data dynamically between different storage devices based on predictions regarding which data will be most frequently requested or used in the future. Data that has not been requested or used within a certain period of time (e.g., after one week or month) may be archived (or migrated) to a lower-cost storage device.

Some operating systems for supporting systems that perform high-volume transaction processing, such as z/OS from IBM®, manage data by means of data sets. A data set may comprise a text or binary file that includes data, such as one or more records (e.g., medical records or insurance records) used by a program running on the system. A data set may also be used to store information needed by applications running on the system (e.g., source programs or macro libraries) or by the operating system itself (e.g., system variables).

The location of an existing data set may be determined if the data set name and a corresponding data storage volume are known. A data storage volume (or volume) may comprise a unit of a data storage device that is separately addressable and may be identified by a volume identifier (e.g., a six-character volume serial number or VOLSER). In some cases, if the data set is cataloged, then only the data set name is required in order to locate the data set. However, a cataloged data set may require that the data set have a unique name or identifier. A catalog may describe various data set attributes and provide a mapping to the storage devices or volumes on which the data set is located. In some cases, a catalog and a volume table of contents (VTOC) may reside on a direct access storage device (DASD) that is mounted during operation of the system. The VTOC may list the data sets that reside on the DASD, along with information about the location and size of each of the data sets on the DASD. The system may have a master catalog containing entries for each of the catalogs that are used on the system including pointers to the catalogs. During a system initialization, the master catalog may be read to acquire system-level data sets and to determine the location of the catalogs.

A generation data group may comprise a collection of related data sets. Each data set within a generation data group may be referred to as a generation data set. In some cases, a generation data group may comprise a collection of historically related data sets that are arranged in a chronological order (e.g., successive updates to a particular file). An advantage to grouping related data sets is that all of the data sets in the generation data group may be referred to by a common base name. In some cases, the number of generation data sets in a generation data group may be limited such that once the maximum number is reached, the creation of a new generation data set leads to the deletion of the oldest generation data set in the generation data group, thereby ensuring that the maximum number of generation data sets in the generation data group will not be exceeded.

In some cases, a generation data set may be retrieved by using either a relative generation number or an absolute generation number. An absolute generation number may include a base name and a suffix in the form of GxxxxVyy, where xxxx is an unsigned 4-digit decimal generation number (0001 through 9999) and yy is an unsigned 2-digit decimal version number (00 through 99). For example, A.B.C.G0001V00 may be a generation data set 1 in a generation data group with a base name of "A.B.C." A relative generation number may use a generation data group base name followed by a negative integer, a positive integer, or 0 enclosed in parentheses. For example, a generation data set may be retrieved using a relative generation number such as A.B.C(−1). When a relative generation number is used to catalog a generation data set, the system may assign an absolute generation number to represent the generation data set. The absolute generation number assigned may depend on the number last assigned and the value of the relative generation number that is specified. For example, if A.B.C.G0005V00 was the last generation data set cataloged, and a relative generation number of A.B.C(+2) is provided, then the next generation data set cataloged may be assigned the absolute generation number A.B.C.G0007V00. In some cases, the maximum number of generation data sets in a generation data group may be limited to 255 generation data sets.

BRIEF SUMMARY

According to one aspect of the present disclosure, technology for automating the transfer of data within a data file or between different data files is disclosed.

One embodiment comprises receiving a restore command to restore data associated with a data storage volume and generating a table comprising a plurality of entries associated with the data to be restored. Each entry of the plurality of entries corresponds with a data set stored on the data storage volume. Each entry of the plurality of entries comprises information associated with a base name, a generation number, and a creation date of the data set. The method further comprises sorting the table based on the base name, sorting the table based on the creation date and the generation number within the base name, determining a first generation data group using the sorted table, determining a sequence of generation data sets associated with the first generation data group based on an order of the plurality of entries in the sorted table, and restoring and outputting each generation data set within the sequence of generation data sets.

One embodiment comprises a system comprising a storage device and a processor in communication with the storage device. The storage device stores a table comprising a plurality of entries associated with a data storage volume. Each entry of the plurality of entries corresponds with a data set stored on the data storage volume. Each entry of the plurality of entries comprises information associated with a base name, a generation number, and a creation date of the corresponding data set. The processor receives a restore command to restore data associated with the data storage volume, sorts the table based on the base name, sorts the table based on the creation date and the generation number within the base name, determines a first generation data group using the sorted table, determines a sequence of generation data sets associated with the first generation data group based on an order of the plurality of entries in the sorted table, and restores and outputs each generation data set within the sequence of generation data sets.

One embodiment comprises a computer program product comprising a computer readable storage medium having computer readable program code embodied therewith. The computer readable program code configured to receive a restore command to restore data associated with a data storage volume and to generate a table comprising a plurality of entries associated with the data to be restored. Each entry of the plurality of entries corresponds with a data set stored on the data storage volume. Each entry of the plurality of entries comprises information associated with a base name, a generation number, and a creation date of the data set. The computer readable program code configured to sort the table based on the base name and then to sort the table based on the creation date and the generation number within the base name, to determine a first generation data group using the sorted table, to determine a sequence of generation data sets associated with the first generation data group based on an order of the plurality of entries in the sorted table, and to restore and output each generation data set within the sequence of generation data sets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for automating the processing of generation data groups as groups prior to data recovery. The generation data groups to be recovered may correspond with a data storage volume that has been taken offline or has suffered a hardware failure. In some cases, generation data sets associated with a generation data group that has exceeded a maximum number of generation data sets (e.g., a GDGLIMIT) may not be able to be recovered properly without preprocessing of the generation data sets. Prior to data recovery, a table of data sets associated with the data to be recovered may be created and then sorted based on the base names and creation dates of the data sets. The sorted table may be used to identify a particular sequence of generation data sets associated with a particular generation data group to be recovered. The generation data sets corresponding with the particular generation data group to be restored may be selected based on a catalog status of the particular generation data set. Some of the generation data sets may be restored by acquiring backed up or archived versions of the generation data sets. However, the order of the backed up or archived versions may not correspond with their creation dates as backups and archiving may be performed on the generation data sets at different times (e.g., based on when they were last used or touched).

In some embodiments, a generation data group may comprise a particular number of active elements (e.g., 10 active elements) up to a maximum number of active elements (e.g., 255 active elements). For example, a generation data group may comprise 10 versions of a particular database log file. Each version of the particular database log file may correspond with an incremental update or a standalone file as determined by a database application generating the particular database log file. Once a new generation data set (e.g., an update to the particular database log file) is added to the particular generation data group that causes the maximum number of active elements to be exceeded, then a status bit or flag may be set indicating that the particular generation data group has wrapped around or is in a rolled-off state. An active element is one that is cataloged within a generation data group and may be referred to using a relative generation number. It should be noted that an active element may also be referred to by its absolute generation number.

In one embodiment, all of the generation data sets associated with a user command to recover or restore data are tabled, sorted by base name and then sorted by creation date and generation number. The grouping of generation data sets to be restored may be selected based on a current catalog status for the corresponding generation data set and whether the corresponding generation data group has empty slots for active data sets.

Figure 1:
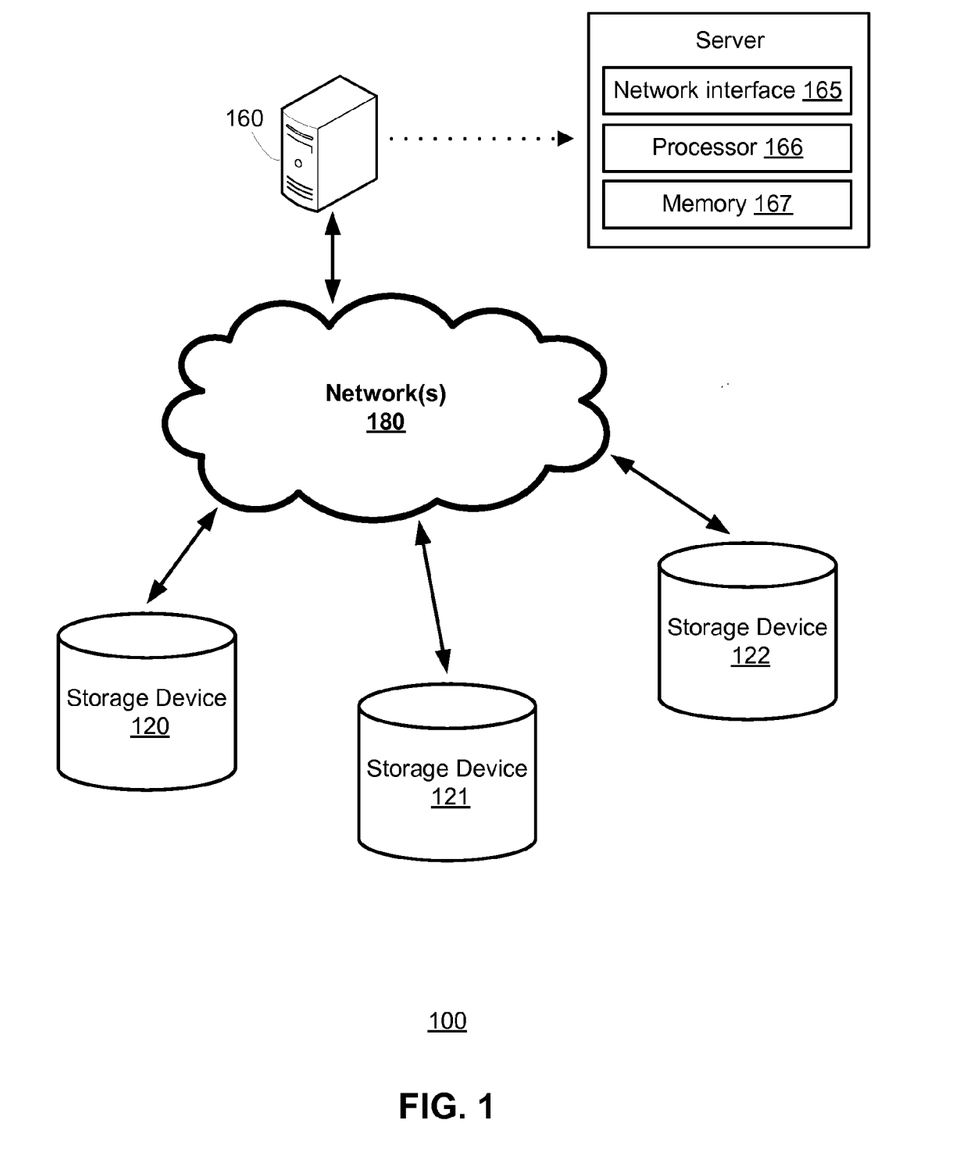
FIG. 1 depicts one embodiment of a networked computing environment.

FIG. 1 depicts one embodiment of a networked computing environment 100 in which the disclosed technology may be practiced. Networked computing environment 100 includes a plurality of storage devices interconnected through one or more networks 180. The one or more networks 180 allow a particular computing device, such as server 160, to connect to and communicate with the plurality of storage devices or another computing device not depicted. The depicted storage devices include storage devices 120-122. Storage devices 120-122 may comprise a tiered data storage infrastructure (or a portion of a tiered data storage infrastructure). In one example, storage device 120 may comprise a hard disk drive, storage device 121 may comprise a magnetic tape drive, and storage device 122 may comprise a solid-state drive. In some cases, a tiered data storage infrastructure may include redundant arrays of independent disks and/or storage area networks. The one or more networks 180 may include a secure network such as an enterprise private network, an unsecure network such as a wireless open network, a local area network (LAN), a wide area network (WAN), a storage area network (SAN), and/or the Internet. Each network of the one or more networks 180 may include hubs, bridges, routers, switches, and wired transmission media such as a wired network or direct-wired connection.

Server 160 may comprise a data storage management server. In some cases, server 160 may comprise a network attached storage server, a data storage server, a network server, or a file server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

Figure 2:
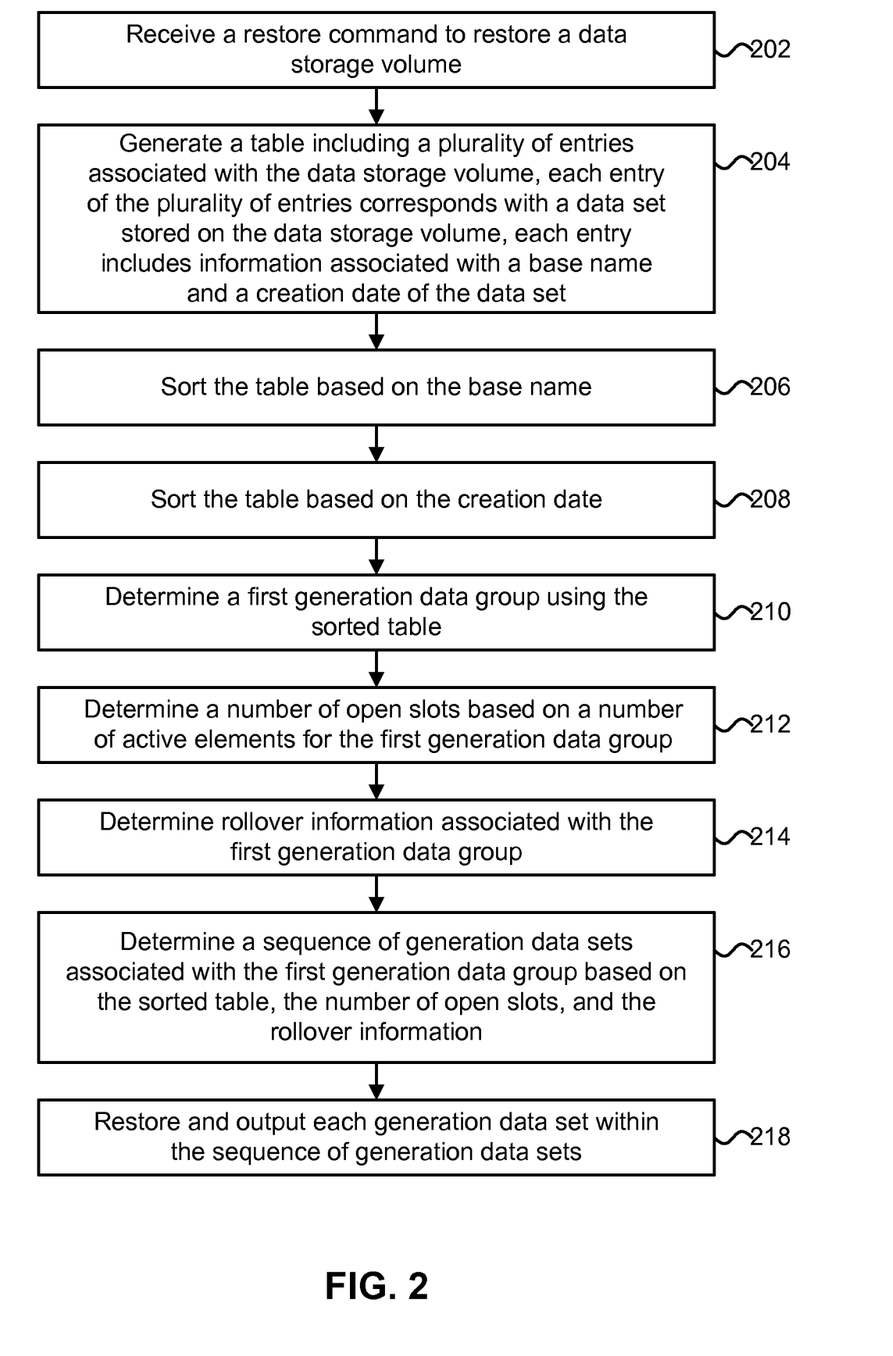
FIG. 2 is a flowchart describing one embodiment of a process for automating the processing of generation data groups prior to data recovery.

FIG. 2 is a flowchart describing one embodiment of a process for automating the processing of generation data groups prior to data recovery. In one embodiment, the process of FIG. 2 is performed by a server, such as server 160 in FIG. 1.

In step 202, a restore command to restore a data storage volume is received. The restore command may be issued from an end user or operator of a data storage management server, such as server 160 in FIG. 1. In some embodiments, the restore command may comprise a command that explicitly names one or more data sets to be restored. In other embodiments, the restore command may comprise a command that specifies one or more data sets to be restored using pattern names (like application group), regular expressions, and/or wildcards (e.g., using an asterisk sign to match zero or more characters). The restore command may also specify restrictions such as restoring only a limited number of data sets, restoring only the data sets that are in an active state or that are cataloged, or restoring only the data sets that are from a limited set of volumes.

In one embodiment, the data storage volume may be identified by a volume serial number. The restore command may be issued in response to the data storage volume being taken offline or being disconnected from a data storage management system due to a hardware failure.

In step 204, a table including a plurality of entries associated with the data storage volume is generated. The table may be generated and stored on a data storage management server, such as server 160 in FIG. 1. Each entry of the plurality of entries may correspond with a data set stored on the data storage volume. Each entry of the plurality of entries may include information associated with a base name and a creation date of the corresponding data set.

In step 206, the table is sorted based on the base name. In step 208, the table is sorted based on the creation date. In one embodiment, the order of the plurality of entries within the sorted table may be such that the most recently created data sets for a given generation data group are placed at the top of the entries corresponding with the given generation data group (or base name grouping). In other embodiments, the table may be sorted by creation date in an ascending order such that more recently created data sets are placed above other data sets. In some cases, a single sorting command or routine may sort the table based on a plurality of input fields (e.g., base name, creation date, and generation number). In some embodiments, the table may be sorted based on the base name, and then sorted based on the creation date and generation number within the base name. In step 210, a first generation data group (i.e., one of the generation data groups) is determined using the sorted table. In one embodiment, the first generation data group may correspond with the generation data group with the largest number of corresponding generation data sets. The first generation data group may also correspond with a user-specified data group to be recovered from the data storage volume (e.g., as specified in the restore command received in step 202). In step 212, a number of open slots for the first generation data group is determined based on a maximum number of active elements for the first generation data group and the number of active elements currently used by the first generation data group. In one example, the maximum number of active elements for the first generation data group may comprise 10 active elements and the number of open slots for the first generation data group may comprise five open slots (i.e., only five of the 10 active elements are currently used).

In step 214, rollover information associated with the first generation data group is determined. The rollover information may comprise a wraparound flag or rolled-off state flag. In one embodiment, the determination of the wrapped information may correspond with whether an absolute generation number for the first generation data group has exceeded G9999.

In step 216, a sequence of generation data sets associated with the first generation data group is determined based on the sorted table, the number of open slots, and the rollover information. In one embodiment, if the first generation data group is not cataloged and the number of open slots corresponds with five generation data sets, then the sequence of generation data sets associated with the first generation data group may comprise the five topmost generation data sets associated with the base name of the first generation data group. In step 218, each generation data set within the sequence of generation data sets is restored and outputted. In some cases, a generation data set may be restored based on an archived version of the generation data set. A generation data set may be outputted as a file from a server, such as server 160 in FIG. 1, to another computing device.

In some embodiments, the restore command may comprise a command the explicitly names the data sets to be restored or a command that identifies the data sets to be restored by volume and/or pattern names. The data sets to be restored may then be tabled and sorted by base name and creation date. Once the data sets to be restored have been sorted and the generation data groups have been identified (e.g., based on the grouping of the data sets within the sorted table), then catalog information may be acquired for each of the generation data groups. If a particular generation data set is cataloged, then it will be restored. However, if a particular generation data group is not cataloged, then the number of data sets to be restored may depend on the number of open slots associated with the particular generation data group and/or any user-specified restrictions on the number of data sets that may be restored.

Figure 3:
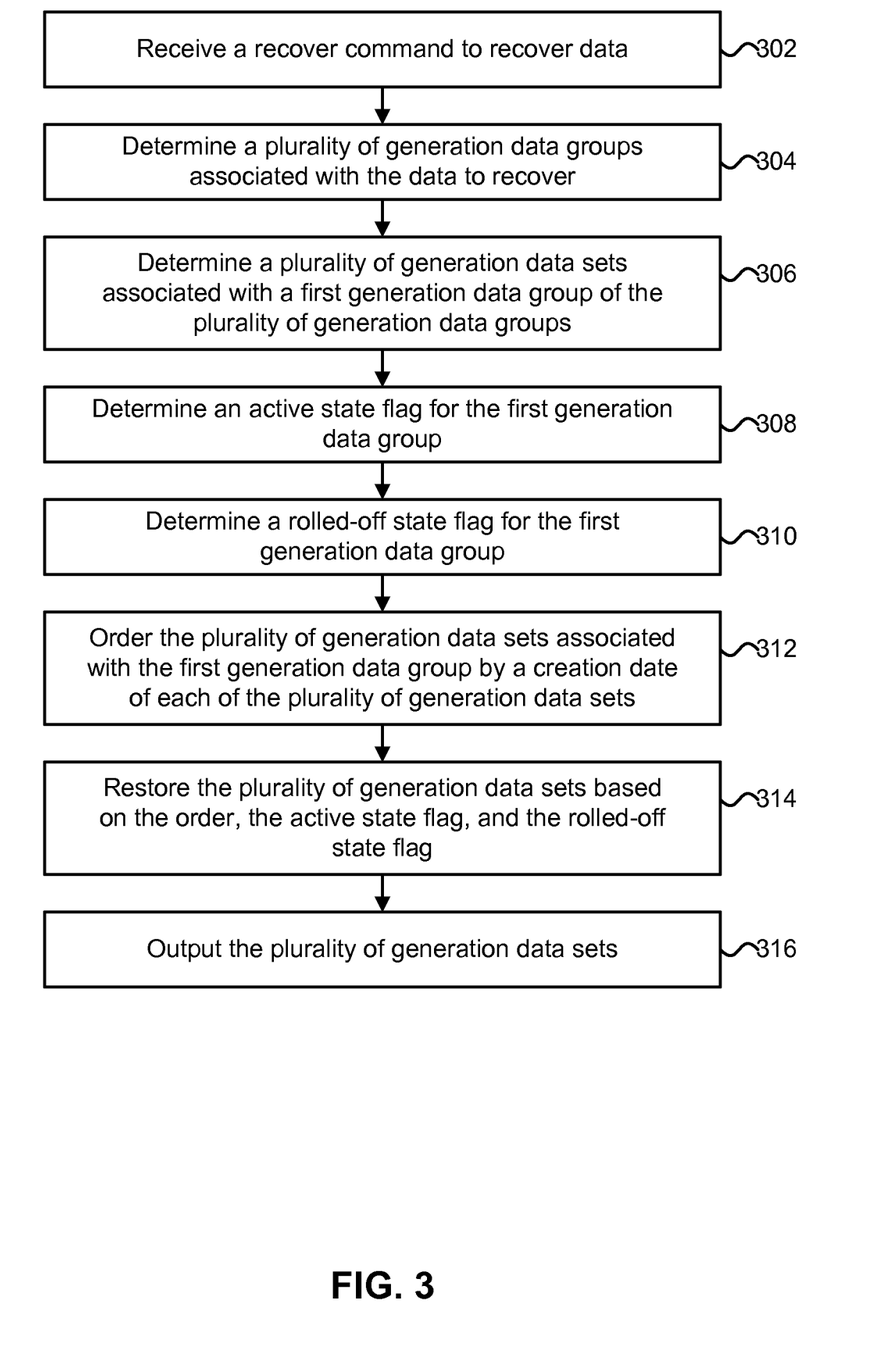
FIG. 3 is a flowchart describing an alternative embodiment of a process for automating the processing of generation data groups prior to data recovery.

FIG. 3 is a flowchart describing an alternative embodiment of a process for automating the processing of generation data groups prior to data recovery. In one embodiment, the process of FIG. 3 is performed by a server, such as server 160 in FIG. 1.

In step 302, a recover command to recover data is received. The data to be recovered may be associated with data located on a data storage volume. The recover command may be issued from an end user or operator of a data storage management server, such as server 160 in FIG. 1. In some embodiments, the recover command may comprise a command that explicitly names one or more data sets to be recovered. In other embodiments, the recover command may comprise a command that specifies one or more data sets to be recovered using pattern names (like application group), regular expressions, and/or wildcards (e.g., using an asterisk sign to match zero or more characters). The recover command may also specify restrictions such as recovering only a limited number of data sets or recovering the data sets from a limited set of volumes.

In one embodiment, data to be recovered may be associated with a data storage volume that is identified by a volume serial number. The recover command may be issued in response to a data storage volume being taken offline or being disconnected from a data storage management system due to a hardware failure.

In step 304, a plurality of generation data groups associated with the data to recover is determined. In one embodiment, the plurality of generation data groups may be determined by acquiring and sorting catalog information associated with a data storage volume containing the data to recover. In some cases, data set information associated with the plurality of generation data groups may be placed into a file in a table format (e.g., a table). The table may comprise a plurality of entries associated with the data set information. The table may be generated and stored on a data storage management server, such as server 160 in FIG. 1. Each entry of the plurality of entries may correspond with a data set stored on a data storage volume. Each entry of the plurality of entries may include information associated with a base name and a creation date of the corresponding data set. In some embodiments, the table may be first sorted based on base names and then sorted based on creation dates. In some embodiments, the table may be sorted based on the base name, and then sorted based on the creation date and generation number within the base name. In one embodiment, the order of the plurality of entries within the sorted table may be such that the most recently created data set for a given generation data group is placed at the top of the entries corresponding with the given generation data group (or base name group).

In step 306, a plurality of generation data sets associated with a first generation data group of the plurality of generation data groups is determined. The first generation data group may correspond with the generation data group with the lowest alphanumberic base name. The first generation data group may also correspond with a user-specified data group to be recovered from a data storage volume.

In step 308, an active state flag for the first data set in the generation data group is determined. The active state flag may correspond with whether the first generation data group includes one or more active elements, which may be referred to using relative generation numbers. In step 310, a rolled-off state flag for the first generation data group is determined. The wrapped state flag may correspond with whether an absolute generation number for the first generation data group has exceeded G9999.

In step 312, the plurality of generation data sets associated with the first generation data group is ordered by a creation date associated with each of the plurality of generation data sets. The plurality of generation data sets may be ordered by sorting a table including the plurality of generation data sets by creation date and generation number. In step 314, the plurality of generation data sets is restored based on the order determined in step 312, the active state flag, the rolled-off state flag, and the wrapped flag. In step 316, the plurality of generation data sets is outputted. In some cases, a plurality of generation data sets may be restored based on archived versions of the generation data sets and outputted as corresponding files from a server, such as server 160 in FIG. 1.

Figure 4:
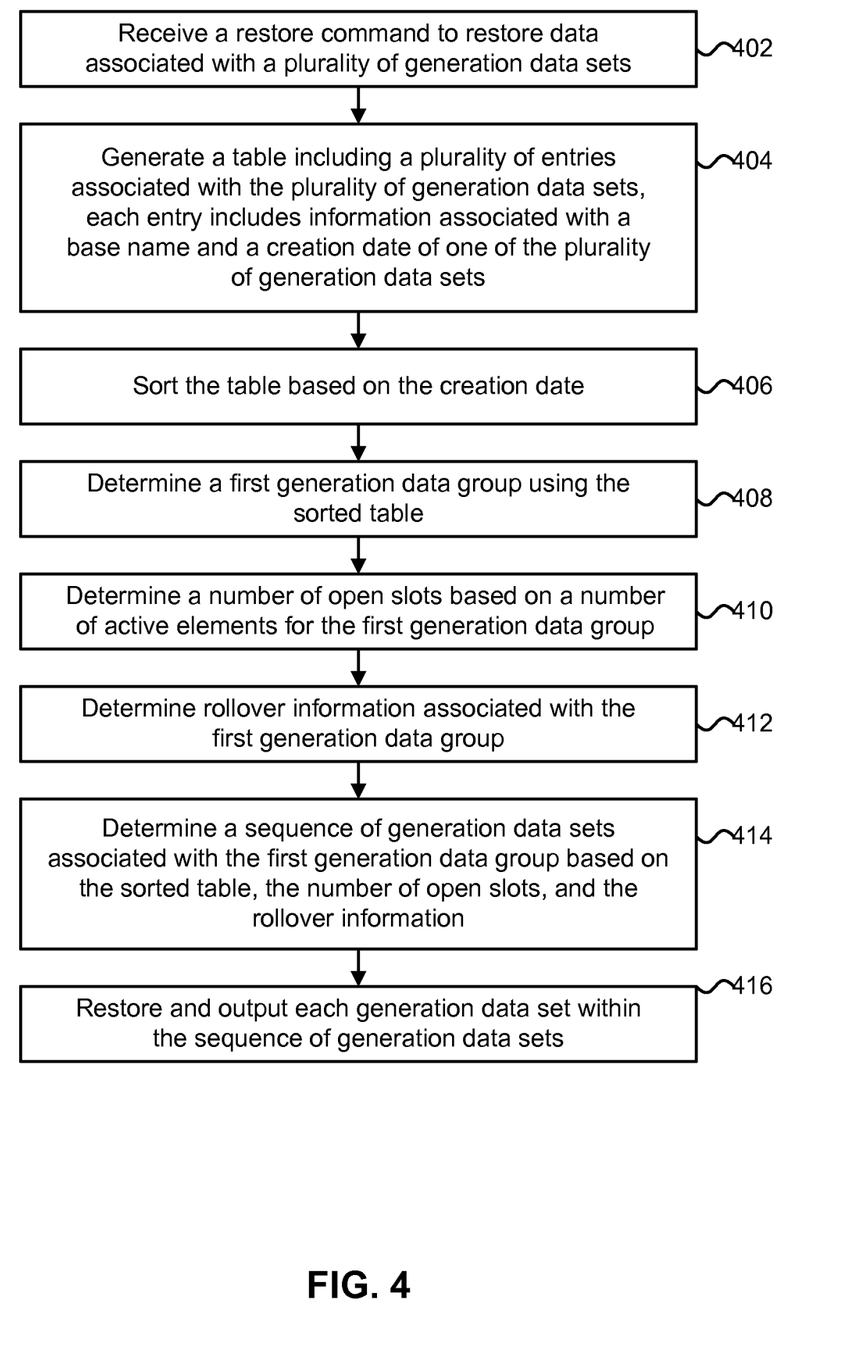
FIG. 4 is a flowchart describing one embodiment of a process for automating the processing of generation data sets prior to data recovery.

FIG. 4 is a flowchart describing one embodiment of a process for automating the processing of generation data sets prior to data recovery. In one embodiment, the process of FIG. 4 is performed by a server, such as server 160 in FIG. 1.

In step 402, a restore command to restore data associated with a plurality of generation data sets is received. The data to be recovered may be associated with data located on a data storage volume. The restore command may be issued from an end user or operator of a data storage management server, such as server 160 in FIG. 1. In some embodiments, the restore command may comprise a command that explicitly names one or more data sets to be restored. In other embodiments, the restore command may comprise a command that specifies one or more data sets to be restored using pattern names (like application group), regular expressions, and/or wildcards (e.g., using an asterisk sign to match zero or more characters). The restore command may also specify restrictions such as restoring only a limited number of data sets or restoring the data sets from a limited set of volumes.

In one embodiment, the data storage volume may be identified by a volume serial number. The restore command may be issued in response to the data storage volume being taken offline or being disconnected from a data storage management system due to a hardware failure.

In step 404, a table including a plurality of entries associated with the plurality of generation data sets is generated. The table may be generated and stored on a data storage management server, such as server 160 in FIG. 1. Each entry of the plurality of entries may correspond with a data set stored on a data storage volume. Each entry of the plurality of entries may include information associated with a base name and a creation date of one of the plurality of generation data sets.

In step 406, the table is sorted based on the creation date and generation number. In one embodiment, the order of the plurality of entries within the sorted table may be such that the most recently created data set is placed as the topmost entry in the table. In step 408, a first generation data group is determined using the sorted table. In one embodiment, the first generation data group may correspond with a user-specified data group to be recovered from a data storage volume. In step 410, a number of open slots for the first generation data group is determined based on a maximum number of active elements for the first generation data group and the number of active elements currently used by the first generation data group. In one example, the maximum number of active elements for the first generation data group may comprise 10 active elements and the number of open slots for the first generation data group may comprise five open slots (i.e., only five of the 10 active elements are currently used).

In step 412, rollover information associated with the first generation data group is determined. The rollover information may comprise a wraparound flag or rolled-off state flag. In one embodiment, the determination of the wrapped information may correspond with whether an absolute generation number for the first generation data group has exceeded G9999.

In step 414, a sequence of generation data sets associated with the first generation data group is determined based on the sorted table, the number of open slots, and the rollover information. In one embodiment, if the first generation data group is not cataloged and the number of open slots corresponds with five generation data sets, then the sequence of generation data sets associated with the first generation data group may comprise the five topmost generation data sets associated with the base name of the first generation data group. In step 416, each generation data set within the sequence of generation data sets is restored and outputted. In some cases, a generation data set may be restored based on an archived version of the generation data set. A generation data set may be outputted as a file from a server, such as server 160 in FIG. 1, to another computing device.

In some embodiments, the restore command may comprise a command the explicitly names each of the plurality of data sets to be restored. The plurality of data sets to be restored may then be tabled and sorted by base name and creation date. Once the plurality of data sets to be restored have been sorted and generation data groups have been identified (e.g., based on the grouping of the data sets within the sorted table), then catalog information may be acquired for each of the generation data groups. If the particular generation data set within the generation group is cataloged, then it will be restored. However, if a particular generation data set is not cataloged, then the number of data sets to be restored may depend on the number of open slots associated with the particular generation data group and/or any user-specified restrictions on the number of data sets that may be restored.

Figure 5:
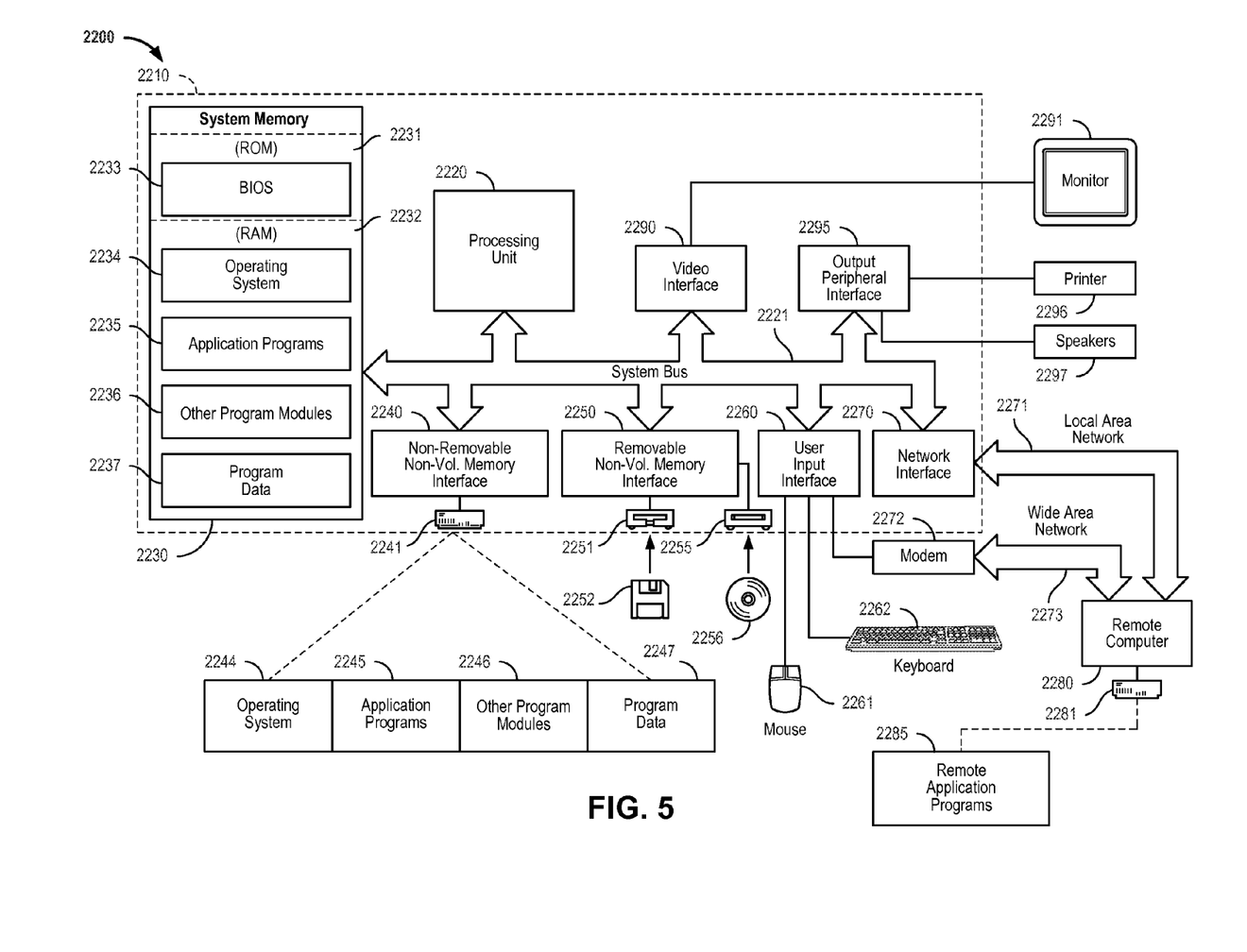
FIG. 5 is a block diagram of an embodiment of a computing system environment.

The disclosed technology may be used with various computing systems. FIG. 5 is a block diagram of an embodiment of a computing system environment 2200, such as server 160 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application programs 2235, other program modules 2236, and program data 2237.

The computer 2210 may also include other removable/non-removable, volatile/nonvolatile computer storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media described above provide storage of computer readable instructions, data structures, program modules and other data for the computer 2210. Hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210. The logical connections may include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application programs 2285 may reside on memory device 2281. It will be appreciated that the network connections shown are exemplary and other means of establishing a communications link between the computers may be used.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data storage system, comprising:
   receiving a restore command at a local server to restore data associated with a data storage volume;
   generating a table comprising a plurality of entries associated with the data to be restored, each entry of the plurality of entries corresponds with a data set stored on the data storage volume, each entry of the plurality of entries comprises a base name, a generation number, and a creation date of the data set;
   sorting the table based on the base name;
   sorting the table based on the creation date and the generation number within the base name;
   determining a first generation data group residing on the local server using the sorted table;
   determining a number of open slots based on a difference between a number of active elements used by the first generation data group and a maximum number of active elements for the first generation data group residing on the local server wherein each active element used by the first generation data group is cataloged within the first generation data group residing on the local server;
   determining a sequence of generation data sets associated with the first generation data group based on an order of the plurality of entries in the sorted table and the number of open slots, the sequence of generation data sets is selected based on the number of open slots;
   determining rollover information associated with the first generation data group, the determining a sequence of generation data sets comprises determining the sequence of generation data sets based on the order of the plurality of entries in the sorted table and the rollover information, the determining rollover information comprises determining whether an absolute generation number for the first generation data group has exceeded the maximum number of active elements for the first generation data group; and
   restoring each generation data set within the sequence of generation data sets to the local server and outputting each generation data set within the sequence of generation data sets from the local server.

2. The method of claim 1, further comprising:
   adding a second generation data set to the first generation data group; and
   automatically deleting a first generation data set of the first generation data group if the maximum number of active elements for the first generation data group is exceeded by adding the second generation data set to the first generation data group, the first generation data set comprises the generation data set of the first generation data group with the earliest creation data.

3. The method of claim 1, wherein:
   the order of the plurality of entries in the sorted table comprises an ascending order such that entries associated with more recently created data sets are placed above other data sets.

4. The method of claim 1, wherein:
   the restoring each generation data set within the sequence of generation data sets comprises acquiring an archived version of the generation data set.

5. The method of claim 1, wherein:
   the outputting each generation data set within the sequence of generation data sets comprises outputting each generation data set as a file.

6. The method of claim 1, wherein:
   the data storage system comprises a tiered storage management system.

7. A data storage system, comprising:
   a storage device, the storage device stores a table comprising a plurality of entries associated with a data storage volume, each entry of the plurality of entries corresponds with a data set stored on the data storage volume, each entry of the plurality of entries comprises a base name and a creation date of the corresponding data set; and
   a processor in communication with the storage device, the processor receives a restore command at a local server to restore data associated with the data storage volume, the processor sorts the table based on the base name and sorts the table based on the creation date, the processor determines a first generation data group residing on the local server using the sorted table, the processor determines a number of open slots based on a difference between a number of active elements used by the first generation data group and a maximum number of active elements for the first generation data group residing on the local server wherein each active element used by the first generation data group is cataloged within the first generation data group residing on the local server, the processor determines a sequence of generation data sets associated with the first generation data group based on an order of the plurality of entries in the sorted table and the number of open slots, the processor selects the sequence of generation data sets based on the number of open slots, the processor restores each generation data set within the sequence of generation data sets to the local server and outputs each generation data set within the sequence of generation data sets from the local server, the processor determines rollover information associated with the first generation data group, the determining a sequence of generation data sets comprises determining the sequence of generation data sets based on the order of the plurality of entries in the sorted table and the rollover information, the processor determines the rollover information by determining whether an absolute generation number for the first generation data group has exceeded the maximum number of active elements for the first generation data group.

8. The system of claim 7, wherein:
the processor adds a second generation data set to the first generation data group and automatically deletes a first generation data set of the first generation data group if the maximum number of active elements for the first generation data group is exceeded by adding the second generation data set to the first generation data group, the first generation data set comprises the generation data set of the first generation data group with the earliest creation data.

9. The system of claim 7, wherein:
the order of the plurality of entries in the sorted table comprises an ascending order such that entries associated with more recently created data sets are placed above other data sets.

10. The system of claim 7, wherein:
the processor restores a first generation data set within the sequence of generation data sets by acquiring an archived version of the first generation data set.

11. The system of claim 7, wherein:
the processor outputs a first generation data set within the sequence of generation data sets by outputting a file associated with the first generation data set.

12. The system of claim 7, wherein:
the data storage system comprises a tiered storage management system.

13. A computer program product, comprising:
a non-transitory computer readable storage medium having computer readable program code embodied therewith, the computer readable program code comprising:
computer readable program code configured to receive a restore command at a local server to restore data associated with a data storage volume;
computer readable program code configured to generate a table comprising a plurality of entries associated with the data to be restored, each entry of the plurality of entries corresponds with a data set stored on the data storage volume, each entry of the plurality of entries comprises a base name and a creation date of the data set;
computer readable program code configured to sort the table based on the base name and then to sort the table based on the creation date;
computer readable program code configured to determining a first generation data group residing on the local server using the sorted table;
computer readable program code configured to determine a number of open slots based on a difference between a number of active elements used by the first generation data group and a maximum number of active elements for the first generation data group residing on the local server wherein each active element used by the first generation data group is cataloged within the first generation data group residing on the local server;
computer readable program code configured to determine a sequence of generation data sets associated with the first generation data group based on an order of the plurality of entries in the sorted table and the number of open slots;
computer readable program code configured to determine rollover information associated with the first generation data group and to determine the sequence of generation data sets based on the order of the plurality of entries in the sorted table and the rollover information; and
computer readable program code configured to restore each generation data set within the sequence of generation data sets to the local server and output each generation data set within the sequence of generation data sets from the local server.

14. The computer program product of claim 13, wherein the computer readable program code comprises:
computer readable program code configured to add a second generation data set to the first generation data group and automatically delete a first generation data set of the first generation data group if the maximum number of active elements for the first generation data group is exceeded by adding the second generation data set to the first generation data group, the first generation data set comprises the generation data set of the first generation data group with the earliest creation data.

15. The computer program product of claim 14, wherein:
the order of the plurality of entries in the sorted table comprises an ascending order such that entries associated with more recently created data sets are placed above other data sets.

* * * * *